US012725808B2

(12) United States Patent
Jilani et al.

(10) Patent No.: US 12,725,808 B2
(45) Date of Patent: Sep. 1, 2026

(54) BIPOLAR PLATE FOR FUEL CELLS, FUEL CELL STACK HAVING SUCH BIPOLAR PLATES, AND VEHICLE HAVING SUCH A FUEL CELL STACK

(71) Applicant: AUDI AG, Ingolstadt (DE)

(72) Inventors: Adel Jilani, Burnaby (CA); Sanjiv Kumar, Burnaby (CA); Radu P. Bradean, Burnaby (CA); Sebastian Voigt, Heilbronn (DE)

(73) Assignee: AUDI AG, Ingolstadt (DE)

(*) Notice: Subject to any disclaimer, the term of this patent is extended or adjusted under 35 U.S.C. 154(b) by 832 days.

(21) Appl. No.: 17/602,693

(22) PCT Filed: Mar. 20, 2020

(86) PCT No.: PCT/EP2020/057720
§ 371 (c)(1),
(2) Date: Oct. 8, 2021

(87) PCT Pub. No.: WO2020/207754
PCT Pub. Date: Oct. 15, 2020

(65) Prior Publication Data

US 2022/0166033 A1 May 26, 2022

(30) Foreign Application Priority Data

Apr. 9, 2019 (DE) ..................... 10 2019 205 069.7

(51) Int. Cl.
*H01M 8/0258* (2016.01)
*H01M 4/86* (2006.01)
(Continued)

(52) U.S. Cl.
CPC ....... *H01M 8/0258* (2013.01); *H01M 8/0206* (2013.01); *H01M 8/0213* (2013.01);
(Continued)

(58) Field of Classification Search
CPC ............. H01M 8/0258; H01M 8/0206; H01M 8/0213; H01M 8/0228; H01M 8/0267; H01M 2004/8694; H01M 2250/20
See application file for complete search history.

(56) References Cited

U.S. PATENT DOCUMENTS

2005/0106444 A1 5/2005 Yamauchi et al.
2009/0004542 A1* 1/2009 Budinski ............ H01M 8/0273 29/623.2

(Continued)

FOREIGN PATENT DOCUMENTS

DE 10328039 A1 1/2005
DE 102004016494 A1 10/2005

(Continued)

OTHER PUBLICATIONS

International Search Report, mailed Jun. 4, 2020, for International Application No. PCT/EP2020/057720, 5 pages.

(Continued)

*Primary Examiner* — Adam A Arciero

(57) ABSTRACT

A bipolar plate for a fuel cell, is provided having an anode plate with an anode side and a coolant side, wherein there is formed on the anode side a first structuring in order to form an anode flow field, and a cathode plate with a cathode side and a coolant side, wherein there is formed on the cathode side a second structuring to form a cathode flow field, there being arranged between the anode plate and the cathode plate structural elements to form a coolant flow field, being contacted from the coolant sides of the anode plate and the cathode plate, and having an optimized pressure distribution in a fuel cell stack and an increased stability as compared to the prior art. The structural elements consist of an elastic material. A fuel cell stack and a vehicle including such features are also provided.

10 Claims, 6 Drawing Sheets

(51) Int. Cl.
*H01M 8/0206* (2016.01)
*H01M 8/0213* (2016.01)
*H01M 8/0228* (2016.01)
*H01M 8/0267* (2016.01)

(52) U.S. Cl.
CPC ....... *H01M 8/0228* (2013.01); *H01M 8/0267* (2013.01); *H01M 2004/8694* (2013.01); *H01M 2250/20* (2013.01)

(56) References Cited

U.S. PATENT DOCUMENTS

| | | | | |
|---|---|---|---|---|
| 2010/0009233 | A1* | 1/2010 | Blanchet ............. | H01M 8/0206<br>429/415 |
| 2015/0037705 | A1 | 2/2015 | Iritsuki et al. | |

FOREIGN PATENT DOCUMENTS

| | | | |
|---|---|---|---|
| JP | 2013-97982 | A | 5/2013 |
| WO | 2004/112178 | A2 | 12/2004 |
| WO | 2010/054647 | A2 | 5/2010 |

OTHER PUBLICATIONS

International Preliminary Report on Patentability, dated Jun. 4, 2020, for International Application No. PCT/EP2020/057720, 7 pages.

* cited by examiner

BIPOLAR PLATE FOR FUEL CELLS, FUEL CELL STACK HAVING SUCH BIPOLAR PLATES, AND VEHICLE HAVING SUCH A FUEL CELL STACK

BACKGROUND

Technical Field

Embodiments of the invention relate to a bipolar plate for a fuel cell, comprising an anode plate with an anode side and a coolant side, wherein there is formed on the anode side a first structuring in order to form an anode flow field, and a cathode plate with a cathode side and a coolant side, wherein there is formed on the cathode side a second structuring to form a cathode flow field; there being arranged between the anode plate and the cathode plate structural elements to form a coolant flow field, being contacted from the coolant sides of the anode plate and the cathode plate. Furthermore, embodiments of the invention relate to a fuel cell stack having such bipolar plates and a vehicle having such a fuel cell stack.

Description of the Related Art

Fuel cells utilize the chemical reaction of a fuel with oxygen to form water, in order to generate electrical energy. For this, fuel cells contain as their key component the so-called membrane electrode assembly (MEA), which is a construction made from an ionically conductive (usually proton conductive) membrane and catalytic electrodes arranged on either side of the membrane (anode and cathode). The latter usually comprise supported precious metals, especially platinum. Furthermore, gas diffusion layers (GDL) may be arranged on either side of the membrane electrode assembly on the sides of the electrodes facing away from the membrane. As a rule, the fuel cell is formed by a plurality of MEAs arranged in a stack, the electrical potentials of which are added up. Between the individual membrane electrode assemblies there are generally arranged bipolar plates (also called flow field or separator plates), which ensure a supplying of the single cells with the operating media, i.e., the reactants, and usually also serve for the cooling. Furthermore, the bipolar plates ensure an electrically conductive contact with the membrane electrode assemblies.

In operation of the fuel cell, the fuel (anode operating medium), especially hydrogen $H_2$ or a gas mixture containing hydrogen, is supplied to the anode through an open flow field on the anode side of the bipolar plate, where an electrochemical oxidation of $H_2$ to form protons H+ takes place, giving up electrons ($H_2 \rightarrow 2\ H^+ + 2\ e^-$). Through the electrolyte or the membrane, which separates the reaction spaces in gas-tight manner from each other and electrically isolates them, a (water-bound or water-free) transport of the protons occurs from the anode space to the cathode space. The electrons furnished at the anode are carried along an electrical conduit to the cathode. The cathode is supplied by an open flow field at the cathode side with oxygen or a gas mixture containing oxygen (such as air) as the cathode operating medium, so that a reduction of $O_2$ to form $O^{2-}$ takes place, taking up electrons ($\frac{1}{2}O_2 + 2\ e^- \rightarrow O^{2-}$). At the same time, the oxygen anions in the cathode space react with the protons transported across the membrane to form water ($O^{2-} + 2\ H^+ \rightarrow H_2O$).

The supplying of the fuel cell stack with its operating media, i.e., the anode operating gas (such as hydrogen), the cathode operating gas (such as air) and the coolant, occurs through main supply ducts, which penetrate the stack in its entire stacking direction and from which the operating media are supplied across the bipolar plates to the single cells. At least two such main supply ducts are present for each operating medium, namely, one to supply the particular operating medium and one to take it away.

Typically, bipolar plates consist of two half-plates which are joined together and structured on both sides. On the sides facing away from each other there need to be structurings for the transport of the operating media and on the sides facing each other there need to be structurings for the transport of coolant. The half-plates need to be coordinated with each other, since three separate transport pathways need to be provided by means of two half-plates. This results in further boundary conditions, which reduces the flexibility of the configurations of the bipolar plates. In typical configurations, the half-plates of the known bipolar plates are profiled, and the profiles mesh with or are nested in each other.

The fuel cell stack typically has end plates at its opposite stack ends, which are joined together by means of clamping devices as part of a clamping system. By means of the clamping devices, tensioning forces are transmitted, which pull the end plates together and compress the single cells arranged between them, i.e., they press them together. Another part of the clamping system is compression springs, in order to load the stack evenly and avoid damaging it.

BRIEF SUMMARY

Embodiments of the invention provide a bipolar plate which at least partly eliminates the disadvantages in connection with compression springs.

In some embodiments, this problem is solved by a bipolar plate, a fuel cell stack and a vehicle having such a fuel cell stack.

The bipolar plate comprises an anode plate with an anode side and a coolant side, wherein there is formed on the anode side a first structuring in order to form an anode flow field. Moreover, the bipolar plate comprises a cathode plate with a cathode side and a coolant side, wherein there is formed on the cathode side a second structuring to form a cathode flow field. There are arranged between the anode plate and the cathode plate structural elements to form a coolant flow field, contacting the coolant sides of the anode plate and the cathode plate. According to some embodiments, the structural elements are made from an elastic material.

These structural elements serve as embedded springs in a fuel cell stack having the bipolar plates described herein, among other things in order to optimize the compression while at the same time enhancing the robust structure.

Furthermore, in this way it is possible to reduce the height of the fuel cell stack as compared to the prior art, since the compression springs which are usually required can be eliminated. These compression springs of the prior art furthermore do not afford adequate control of the pressing force on the active surface of the bipolar plate, and the resulting nonuniform stack compression may lead to plate breakage. This is avoided by the bipolar plate described herein. Moreover, a weight saving is possible by doing away with compression springs. Buckling of the end plate is also minimized. Furthermore, the effects of the penetration of GDL/MEA can be minimized.

Moreover, a cost reduction during the fabrication of the plate can be realized, for example by doing away with the compression springs and by the possibility of using the Form-In-Place (FIP) process for large series manufacturing.

The bipolar plate described herein, apart from the structural elements, may consist of a conductive material, such as a carbon-based material, such as graphite or a composite material made of graphite and carbon. The use of metal is also contemplated.

The structural elements may consist of an elastic conductive polymer which is stable in the temperature range of the fuel cell operation, and at least one structural element may be conductive. Silicone or siloxane may be used, while polydimethylsiloxane is one option.

The polymer may have an electrical conductivity of >100 S/cm. The electrical resistance may be 0.0008 Ω cm and the modulus of compression may be 5 MPa.

The structural elements are arranged between the anode plate and the cathode plate at a spacing from each other, so that the coolant can flow through the coolant flow field of the bipolar plate with the lowest possible pressure losses.

The structural elements are column-shaped, with a constant cross section over the entire length of the individual structural element or with a variable cross section over the length, for example, having a reduced cross section at the middle of the structural elements.

The structural elements may have different sizes of cross sectional surfaces distributed over the surface of the bipolar plate, in order to satisfy different requirements for the spring force in different areas of the bipolar plate.

The structural elements may have a rectangular or square cross section, so that a very simple fabrication is possible. Moreover, round or oval cross sections with one or two axes of symmetry are also possible.

According to some embodiments of the bipolar plate, the structurings of the anode plate and the cathode plate are configured such that at least the contact surface of the structural elements on the respective other sides of the anode plate and the cathode plate is covered over by the structurings in order to distribute the pressure over the entire stack height.

Hence, the first structuring of the anode side and the second structuring of the cathode plate as well as the structural elements are arranged directly on top of each other in the stacking direction of the bipolar plates. In this way, damage to the bipolar plate can be prevented.

Further spatial configurations of the anode plate and the cathode plate are easily possible in order to optimize the flow conditions. An equivalent configuration to that of the structural elements may be provided.

A mixing of structural elements having different cross sections is also possible.

The structural elements may be arranged in regular or irregular manner in the coolant flow field to form flow regions, in order to avoid pressure losses and utilize the necessary spring force as needed. The structural elements and optionally the structurings may form a lattice pattern in a regular arrangement.

The structural elements may be secured to at least the anode plate or the cathode plate, for example by bonding, a one-sided fixation making it easier to mount the bipolar plates and being generally sufficient. A bonding to the cathode plate carrying the oxidizing agent may be provided.

According to some embodiments of the bipolar plate, the structural elements are arranged on a carrier plate. This carrier plate may consist of the same material as the structural elements and may be made as a single piece with the structural elements.

The carrier plate may be placed either against the anode plate or against the cathode plate. This configuration enables a much easier mounting of the bipolar plate described herein. Also in this embodiment a bonding can be done to at least the anode plate and the cathode plate similar to that of the individual structural elements.

Apart from the teaching described above, the flow fields of the anode plate and the cathode plate as well as the coolant flow field may be configured individually independently of each other.

Another aspect relates to a fuel cell stack, comprising a stack between two end plates of membrane electrode assemblies arranged in alternating manner and bipolar plates as described herein.

Moreover, some embodiments relate to a vehicle, comprising a fuel cell system having a fuel cell stack as described herein. The vehicle may involve an electric vehicle, in which electrical energy generated by the fuel cell system serves for powering an electric traction motor and/or a traction battery.

Aspects of the various embodiments as mentioned in this application may be combined with each other, unless otherwise stated for an individual instance.

BRIEF DESCRIPTION OF THE SEVERAL VIEWS OF THE DRAWINGS

Embodiments of the invention are described with the aid of the corresponding drawings.

DETAILED DESCRIPTION

Figure 1:
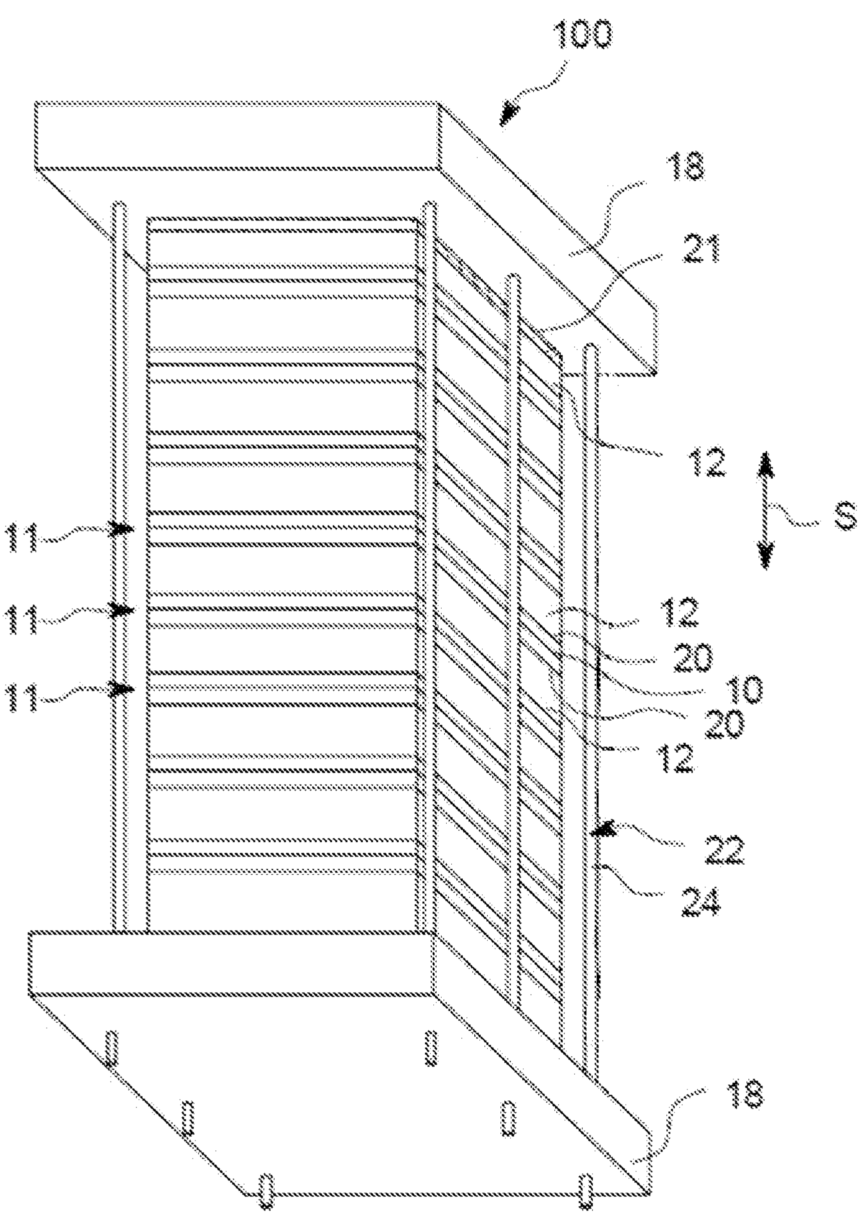
FIG. 1 shows a schematic representation of a fuel cell stack.

FIG. 1 shows in a schematic representation a fuel cell stack, designated overall as 100. The fuel cell stack 100 is part of a vehicle, especially an electric vehicle, comprising an electric traction motor which is supplied with electric energy by the fuel cell stack 100.

The fuel cell stack 100 comprises a plurality of membrane electrode assemblies 10, arranged alongside each other (stacked), and bipolar plates 12, arranged in alternating manner. Thus, in total, multiple stacked single cells 11 for the fuel cell stack 100, while either one of the single cell 11 or also the fuel cell stack 100 overall can be called a fuel cell. The fuel cell stack 100 has end plates 18 at either side. Between the bipolar plates 12 and the respective membrane electrode assemblies 10 are formed anode and cathode spaces, not represented, which are bounded by encircling seals 20. The fuel cell stack 100 is pressed together (compressed) in the stacking direction S by means of a clamping system in order to produce the sealing function of the seals 20, among other things.

The clamping system comprises an outer clamping device 22, as well as elastic structural elements, not visible here, which are arranged in the coolant region of the bipolar plates 12. These shall be described in greater detail in the following.

In order to produce an outer tension, which is transmitted to the structural elements in the fuel cell stack 100, lengthwise tensioning elements 24 of the outer clamping devices 22 pass on tensioning forces between the two end plates 18, so that the end plates 18 are pulled together by means of the tensioning elements 24. For this, the tensioning elements 24 extend in a stacking direction S of the fuel cell stack 100.

Figure 2:
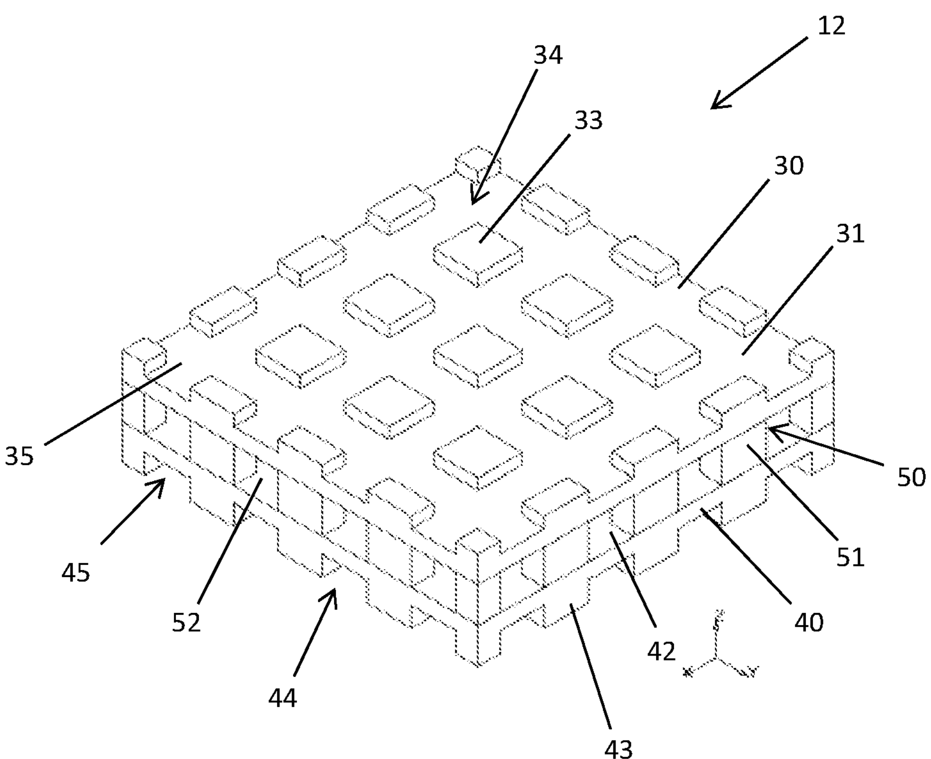
FIG. 2 shows, in perspective top view, a detail of a bipolar plate.
Figure 3:
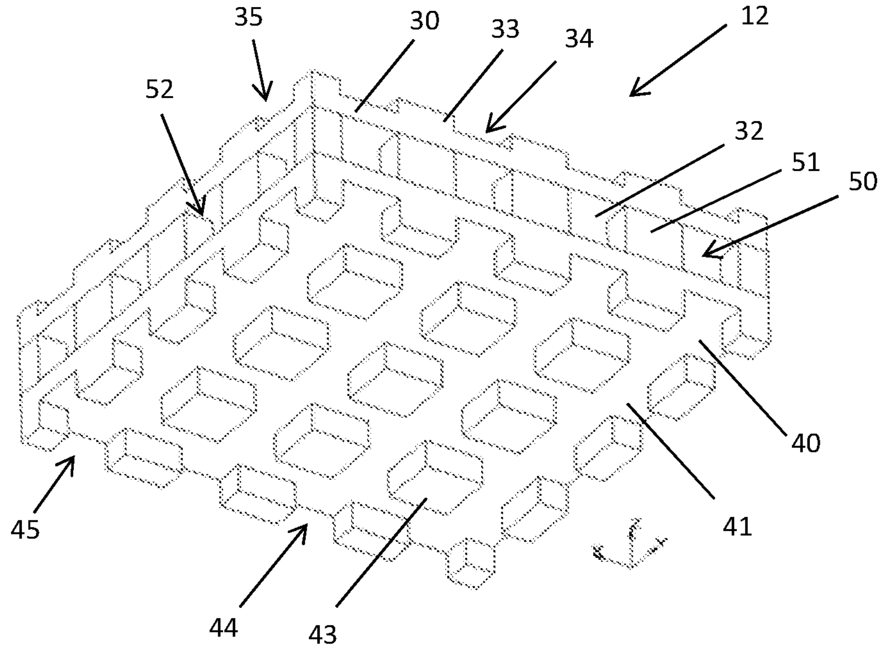
FIG. 3 shows, in perspective bottom view, detail of the bipolar plate according to FIG. 2.
Figure 4:
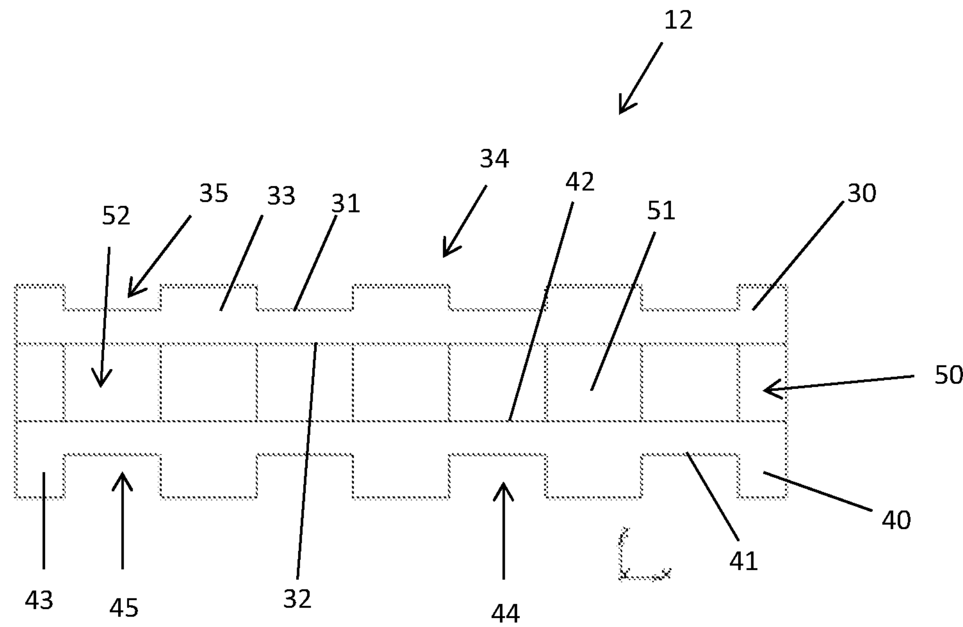
FIG. 4 shows, in a cross sectional diagram, detail of the bipolar plate according to FIGS. 2 and 3.

FIGS. 2 to 4 show a bipolar plate 12 in a first embodiment in different views. Each time, one detail of the bipolar plate 12 is represented.

The bipolar plate 12 here comprises two single plates, an anode plate 30 and a cathode plate 40. The anode plate 30 has an anode side 31 and a coolant side 32, pointing toward the cathode plate 40. The cathode plate 40 has a cathode side 41 and a coolant side 42 pointing toward the anode plate 30. In order to form a coolant flow field 50, elastic structural elements 51 are arranged each time on the coolant side 32, 42 between the anode plate 30 and the cathode plate 40, contacting the anode plate 30 and the cathode plate 40. The structural elements 51 are column-shaped and have a square cross section. These are distributed evenly and thus form flow pathways 52 in the form of a lattice network, through which a coolant can flow in the lengthwise and transverse direction in relation to the principal axis of the bipolar plate 12.

On the anode side 31 and cathode side 41 facing away from the coolant flow field 50 there are provided a first structuring 33 and a second structuring 43, respectively, both of which are configured analogously to the structural elements 51 of the coolant flow field 50 and form an anode flow field 34 and a cathode flow field 44. That is, they are column-shaped with a square cross section. Furthermore, they form flow pathways 35, 45 for the two reaction media, being congruent with the structural elements 51 in the stacking direction S in FIGS. 2 to 4.

Figure 5:
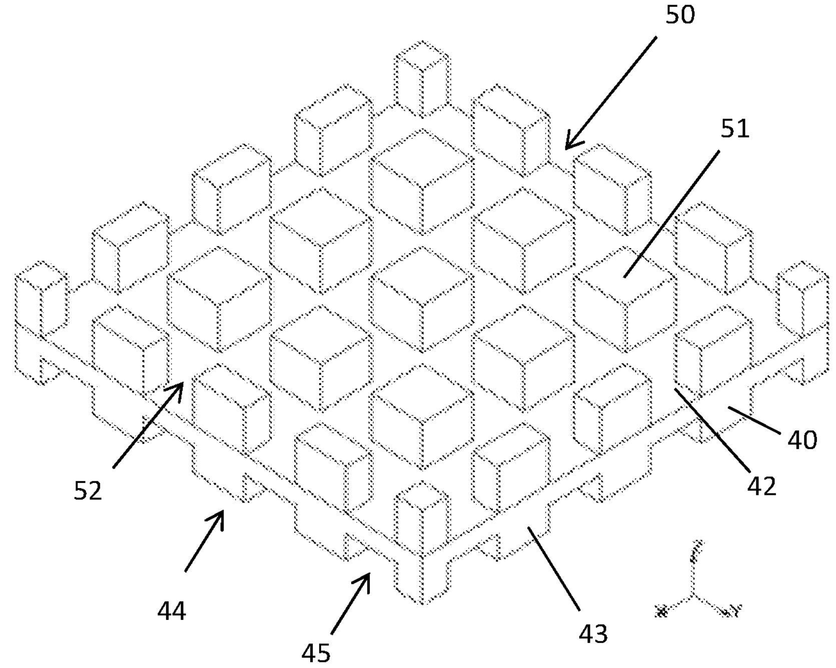
FIG. 5 shows, in perspective view, a detail of a cathode plate with structural elements.

FIG. 5 likewise shows the embodiment according to FIGS. 2 to 4, but with the difference that the anode plate 30 is not represented. The differing dimensions of the structural elements 51 at the center of the cathode plate 40 as compared to those at the margins is merely due to the cut-out shown and has no technical meaning, it being fundamentally possible, of course, for the structural elements 51 to have different dimensions and to be distributed unevenly. To facilitate the mounting of the bipolar plate 12, the structural elements 51 are secured or bonded at least on the coolant side 42 of the cathode plate 40.

Figure 6:
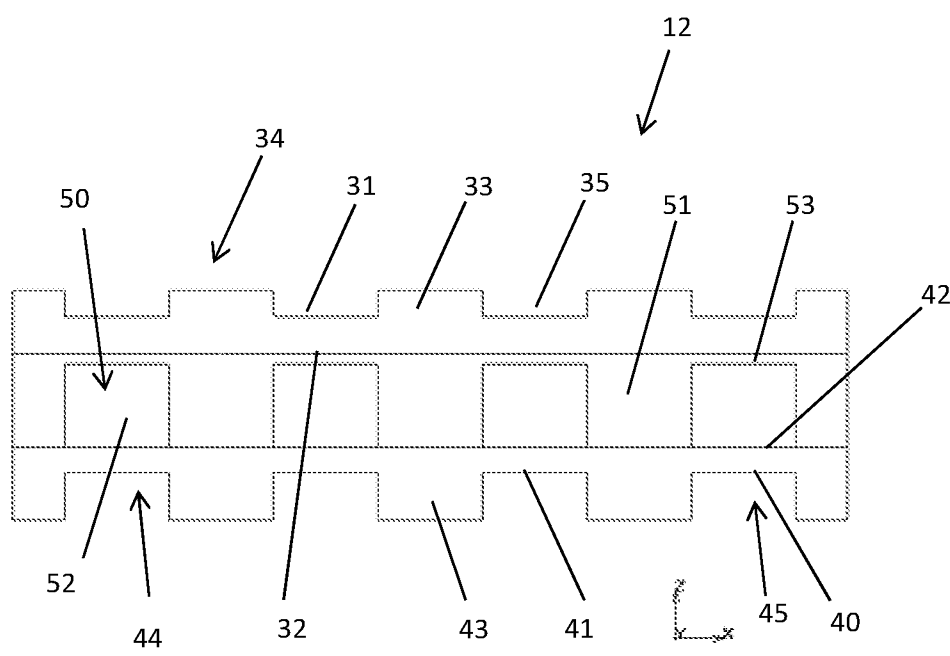
FIG. 6 shows, in a cross sectional view, detail of another bipolar plate.

FIG. 6 in turn shows a detail of a bipolar plate 12 according to a second embodiment, in cross section. In this embodiment, the structural elements 51 are formed as a single piece with a carrier plate 53, which lies with its flat side against the coolant side 42 of the cathode plate 40. The anode plate 30, not shown, is placed with the structural elements 51 on the cathode plate 40, after mounting the carrier plate 53, in order to complete the bipolar plate 12. The use of this carrier plate 53 significantly facilitates the mounting of the bipolar plate 12. In this variant as well, a bonding of the carrier plate 53 and the structural elements 51 can be done.

Figure 7:
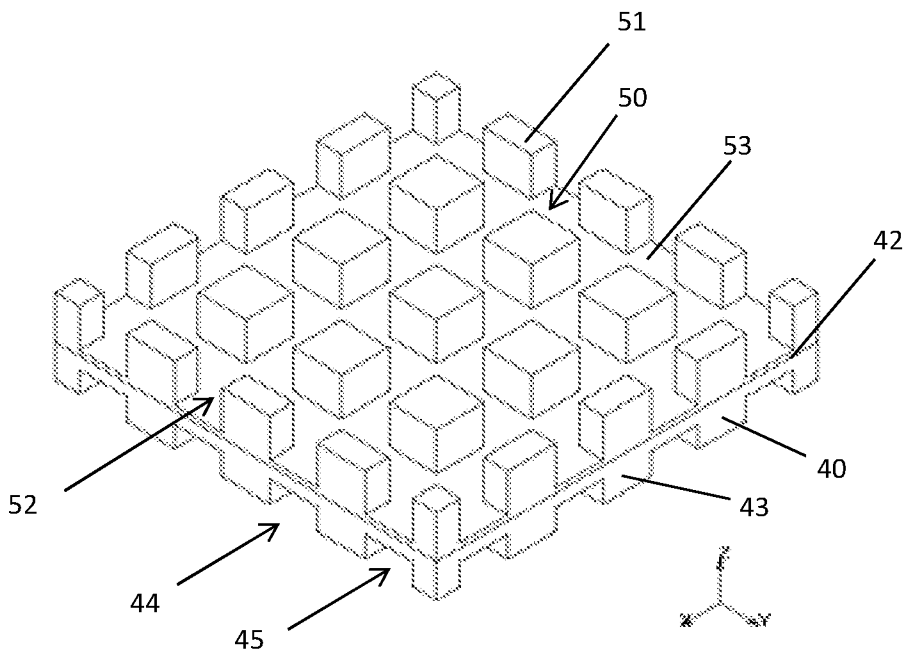
FIG. 7 shows, in perspective view, a detail of a cathode plate with structural elements arranged on a carrier plate.
Figure 8:
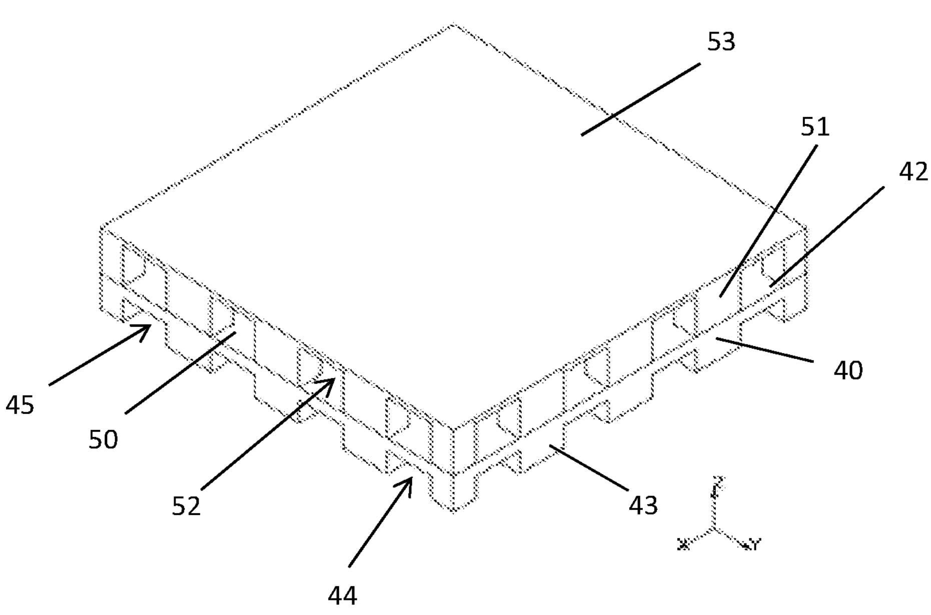
FIG. 8 shows, in perspective view, a detail of another cathode plate with structural elements arranged on a carrier plate.

The other variant in which the side of the carrier plate 53 carrying the structural elements 51 is placed on the coolant side 42 of the cathode plate 40 is shown in FIG. 8. Otherwise, this variant corresponds to the one shown in FIG. 7.

Figure 9:
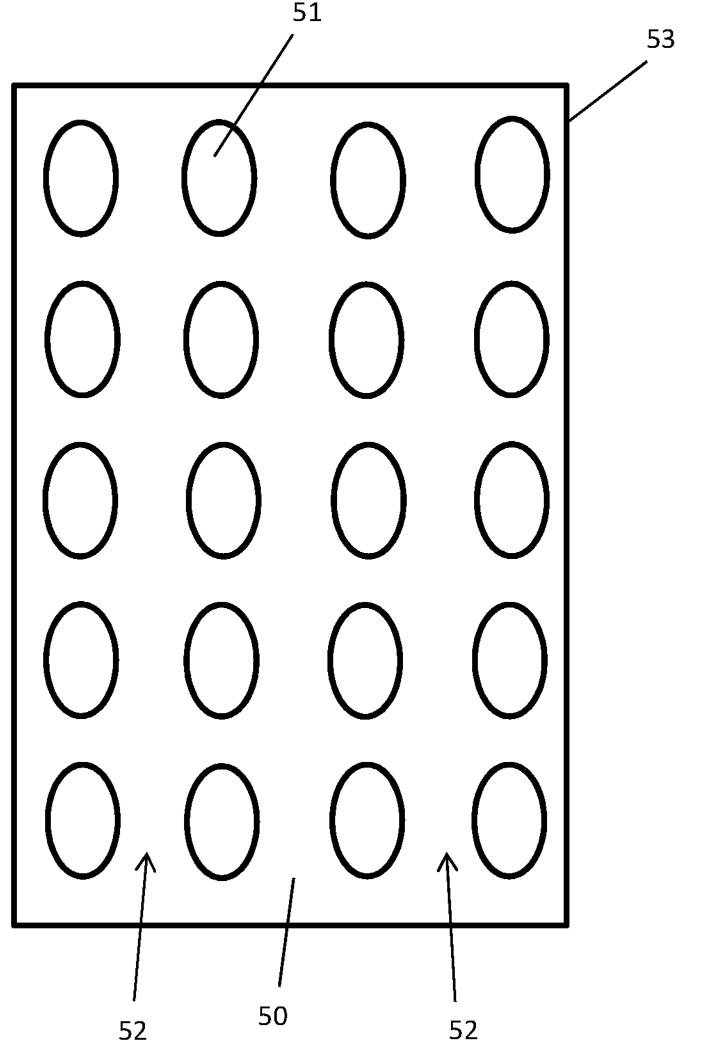
FIG. 9 shows, in a front view, structural elements with oval cross section on a carrier plate.
Figure 10:
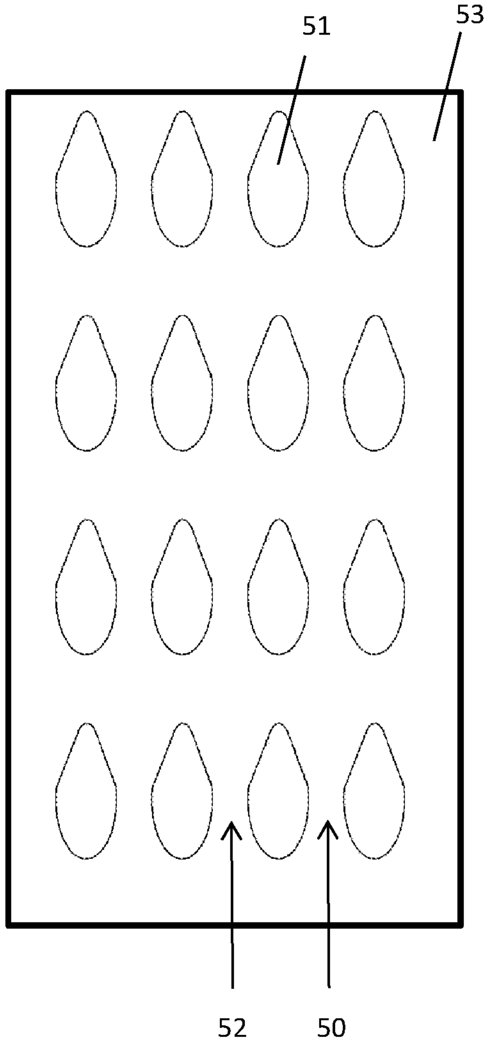
FIG. 10 shows, in a front view, structural elements with oval cross section on a carrier plate.

FIGS. 9 and 10 each show a carrier plate 53 with structural elements 51 arranged thereon, having an oval cross section with two axes of symmetry (FIG. 9) and an oval cross section with one axis of symmetry (FIG. 10). These embodiments serve for optimizing the flow conditions of a coolant. These cross sections can also be chosen as the first structuring 33 and/or the second structuring 43.

Unless otherwise explicitly stated, the configurations pertain equally to all the embodiments.

Again, aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A bipolar plate of a fuel cell, the bipolar plate comprising:

an anode plate with an anode side and a coolant side, wherein there is formed on the anode side a first structuring in order to form an anode flow field;

a cathode plate with a cathode side and a coolant side, wherein there is formed on the cathode side a second structuring to form a cathode flow field; and structural elements that consist of an elastic material and are arranged between the anode plate and the cathode plate to form a coolant flow field, being contacted by the coolant sides of the anode plate and the cathode plate, wherein the structural elements consist of columns that each have a constant cross-sectional profile over a height thereof between the anode plate and the cathode plate and are arranged at a spacing from each other.

2. The bipolar plate according to claim 1, wherein the anode plate and the cathode plate consist of metal or a conductive carbon-based material.

3. The bipolar plate according to claim 1, wherein the structural elements consist of an elastic polymer, and at least one structural element is conductive.

4. The bipolar plate according to claim 1, wherein the first structuring of the anode plate and the second structuring of the cathode plate are positioned one on top of one another and overlap at least partly with the cross-sectional profile of the structural elements in the stacking direction.

5. The bipolar plate according to claim 1, wherein the structural elements are arranged in regular or irregular manner to form flow pathways.

6. The bipolar plate according to claim 1, wherein the structural elements are secured to at least the anode plate or the cathode plate or the structural elements are formed on a carrier plate which is placed against either the anode plate or the cathode plate, and which can be secured to the anode plate or the cathode plate.

7. The bipolar plate according to claim 1, wherein the structurings of the anode plate and/or the cathode plate are column-shaped.

8. The bipolar plate according to claim 1, wherein the anode plate and the cathode plate consist of graphite or a composite material made of graphite and carbon.

9. A fuel cell stack, comprising:

a stack of membrane electrode assemblies and bipolar plates, wherein the membrane electrode assemblies alternate with the bipolar plates, wherein the stack is arranged between two end plates, and wherein each bipolar plate includes:

an anode plate with an anode side and a coolant side, wherein there is formed on the anode side a first structuring in order to form an anode flow field;

a cathode plate with a cathode side and a coolant side, wherein there is formed on the cathode side a second structuring to form a cathode flow field; and structural elements that consist of an elastic material and are arranged between the anode plate and the cathode plate to form a coolant flow field, being contacted by the coolant sides of the anode plate and the cathode plate, wherein the structural elements consist of columns that each have a constant cross-sectional profile over a height thereof between the anode plate and the cathode plate and are arranged at a spacing from each other.

10. A vehicle comprising a fuel cell stack, the fuel cell stack including:

a stack of membrane electrode assemblies and bipolar plates, wherein the membrane electrode assemblies alternate with the bipolar plates, wherein the stack is arranged between two end plates, and wherein each bipolar plate includes:

an anode plate with an anode side and a coolant side, wherein there is formed on the anode side a first structuring in order to form an anode flow field;

a cathode plate with a cathode side and a coolant side, wherein there is formed on the cathode side a second structuring to form a cathode flow field; and structural elements that consist of an elastic material and are arranged between the anode plate and the cathode plate to form a coolant flow field, being contacted by the coolant sides of the anode plate and the cathode plate, wherein the structural elements consist of columns that each have a constant cross-sectional profile over a height thereof between the anode plate and the cathode plate and are arranged at a spacing from each other.

* * * * *